United States Patent
Fan et al.

(10) Patent No.: US 12,192,355 B2
(45) Date of Patent: Jan. 7, 2025

(54) METHOD FOR POSITIONING TERMINAL DEVICE, ELECTRONIC DEVICE AND STORAGE MEDIUM

(71) Applicant: BEIJING XIAOMI MOBILE SOFTWARE CO., LTD., Beijing (CN)

(72) Inventors: Nan Fan, Beijing (CN); Wenxuan Chen, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 247 days.

(21) Appl. No.: 17/875,151

(22) Filed: Jul. 27, 2022

(65) Prior Publication Data

US 2023/0283468 A1    Sep. 7, 2023

(30) Foreign Application Priority Data

Mar. 1, 2022    (CN) .......................... 202210193939.9

(51) Int. Cl.
*H04L 9/30* (2006.01)
*H04L 9/08* (2006.01)

(52) U.S. Cl.
CPC .......... *H04L 9/3073* (2013.01); *H04L 9/0894* (2013.01)

(58) Field of Classification Search
CPC ..... H04L 9/3073; H04L 9/0894; H04L 63/06; H04L 9/0825; H04L 9/30; Y02D 30/70; H04W 12/04; H04W 4/029; H04W 64/00; H04W 4/02; H04W 88/02
See application file for complete search history.

(56) References Cited

U.S. PATENT DOCUMENTS

| 8,559,639 B2* | 10/2013 | Hird ..................... H04L 9/0869 713/182 |
| 2018/0350180 A1* | 12/2018 | Onischuk ............... G07C 13/00 |
| 2019/0394025 A1* | 12/2019 | Maim ..................... H04L 9/006 |
| 2020/0107164 A1 | 4/2020 | Lopatin et al. |
| 2021/0067328 A1* | 3/2021 | Verheyen ............ H04L 63/0442 |

OTHER PUBLICATIONS

European Patent Application No. 22187389.6, Search and Opinion dated Jan. 5, 2023, 8 pages.

* cited by examiner

*Primary Examiner* — Sm A Rahman
(74) *Attorney, Agent, or Firm* — Cozen O'Connor

(57) ABSTRACT

A method for positioning a device includes: sending a query instruction to a server, wherein the query instruction is configured to query a target coordinate location of the terminal device. The method also includes receiving a query response from the server. The query response includes the target coordinate location and a target public key digest. The target coordinate location is obtained by encrypting a coordinate location that is positioned for the device. The target coordinate location is sent to the server as well as the target public key digest synchronously. The method also includes determining a target private key based on the target public key digest; and decrypting the target coordinate location using the target private key to obtain the coordinate location located by the device.

16 Claims, 10 Drawing Sheets

METHOD FOR POSITIONING TERMINAL DEVICE, ELECTRONIC DEVICE AND STORAGE MEDIUM

CROSS-REFERENCE TO RELATED APPLICATION

This application claims priority to Chinese Patent Application No. 202210193939.9, filed on Mar. 1, 2022, the entire content of which is incorporated herein by reference.

TECHNICAL FIELD

The disclosure relates to the field of electronic device technologies, and in particularly, to a method for positioning a terminal device, an electronic device, and a storage device.

BACKGROUND

The number of users of mobile devices and accessories is increasing as mobile technologies develop. Examples of mobile devices include mobile phones and tablets, while a pair of headphone is an example of an accessory. Losing a mobile device or accessory imposes both monetary and non-monetary cost on users. Thus, it is very important to position and find the lost item.

SUMMARY

According to a first aspect of embodiments of the disclosure, a method for positioning a terminal device, for a first terminal device, is provided, comprising: sending a query instruction to a server, wherein the query instruction is configured to query a target coordinate location of a terminal device to be found; receiving a query response from the server, wherein the query response comprises the target coordinate location and a target public key digest, the target coordinate location is obtained by encrypting a coordinate location that is positioned for the terminal device to be found, and the target coordinate location is sent to the server as well as the target public key digest synchronously; determining a target private key based on the target public key digest; and decrypting the target coordinate location using the target private key to obtain the coordinate location located by the terminal device to be found.

According to a second aspect of embodiments of the disclosure, a method for positioning a terminal device, for a second terminal device, is provided, comprising: sending a target public key digest matching a positioning period to a server in response to reaching the positioning period; receiving a target public key from the server and verifying the target public key based on the target public key digest; encrypting a coordinate location positioned by the second terminal device using the target public key to obtain a target coordinate location in response to the target public key passing verification based on the target public key digest; and sending synchronously the target public key digest and the target coordinate location to the server.

According to a third aspect of embodiments of the disclosure, a method for positioning a terminal device, for a relay device, is provided, comprising: receiving a target public key digest from a third terminal device, wherein the target public key digest that matches a positioning period is determined and sent by the third terminal device in response to reaching the positioning period; sending the target public key digest to a server; receiving a target public key from the server and verifying the target public key based on the target public key digest; encrypting a coordinate location positioned by the relay device by using the target public key to obtain a target coordinate location in response to the target public key passing verification based on the target public key digest; and sending synchronously the target public key digest and the target coordinate location to the server.

According to a fourth aspect of embodiments of the disclosure, a method for positioning a terminal device, for a third terminal device, is provided, comprising: sending a target public key digest matching a positioning period to a relay device in response to reaching the positioning period, wherein the target public key digest is configured to, at the relay device, send the target public key digest to a server, verify a target public key in response to receiving the target public key from the server, encrypt a coordinate location positioned by the relay device using the target public key to obtain a target coordinate location in response to the target public key passing verification based on the target public key digest, and send synchronously the target public key digest and the target coordinate location to the server.

According to a fifth aspect of embodiments of the disclosure, a method for positioning a terminal device, for a server, is provided, comprising: receiving a query instruction from a first terminal device, wherein the query instruction is configured to query a target coordinate location of a terminal device to be found; receiving a target public key digest from the terminal device to be found; determining a target public key matching the target public key digest and sending the target public key to the terminal device to be found; receiving a target coordinate location and the target public key digest from the terminal device to be found, wherein the target coordinate location is obtained by encrypting a coordinate location positioned by the terminal device to be found using the target public key in response to the target public key passes verification based on the target public key digest; and sending the target coordinate location and the target public key digest to the first terminal device.

According to a sixth aspect of embodiments of the disclosure, an electronic device is provided, comprising: at least one processor; a memory, connected communicatively to the at least one processor, wherein the memory is configured to store instructions executable by the at least one processor, and when the instructions are executed by the at least one processor, the at least one processor is caused to perform the method as described in the first aspect, or the method as described in the second aspect, or the method as described in the third aspect, or the method as described in the fourth aspect, or the method as described in the fifth aspect.

According to an eleventh aspect of embodiments of the disclosure, a non-transitory computer-readable storage medium is provided. The non-transitory computer-readable storage medium has stored therein a computer program that. When the computer program is executed by a processor, the method as described in the first aspect, or the method as described in the second aspect, or the method as described in the third aspect, or the method as described in the fourth aspect, or the method as described in the fifth aspect is performed.

BRIEF DESCRIPTION OF THE DRAWINGS

These and other aspects and advantages of embodiments of the disclosure will become apparent and more readily from the following descriptions made with reference to the drawings, in which.

DETAILED DESCRIPTION

Reference will now be made in detail to embodiments of the disclosure, examples of which are illustrated in the accompanying drawings, in which the same or similar reference numbers represent the same or similar elements or the elements having the same or similar functions throughout. The embodiments described below with reference to the accompanying drawings are exemplary, intended to explain the disclosure and should not be construed as limiting the disclosure.

In the related art, a terminal device to be found (for example, a lost terminal device) encrypts its own location and then sends it to a server, and the server decrypts it to obtain the location of the terminal device to be found. The way that the server decrypts the location of the terminal device to be found may cause other terminal devices to illegally obtain the location of the terminal device to be found from the server, that is, the location of the terminal device to be found may be leaked. The security of the location of the terminal device to be found and a rate of the terminal device to be found being found by the user are decreased.

In view of the above problems, the disclosure proposes a method and an apparatus for positioning a terminal device, an electronic device and a storage device.

The following describes a method and an apparatus for positioning a terminal device, an electronic device and a storage device according to embodiments of the disclosure with reference to the accompanying drawings.

Figure 1:
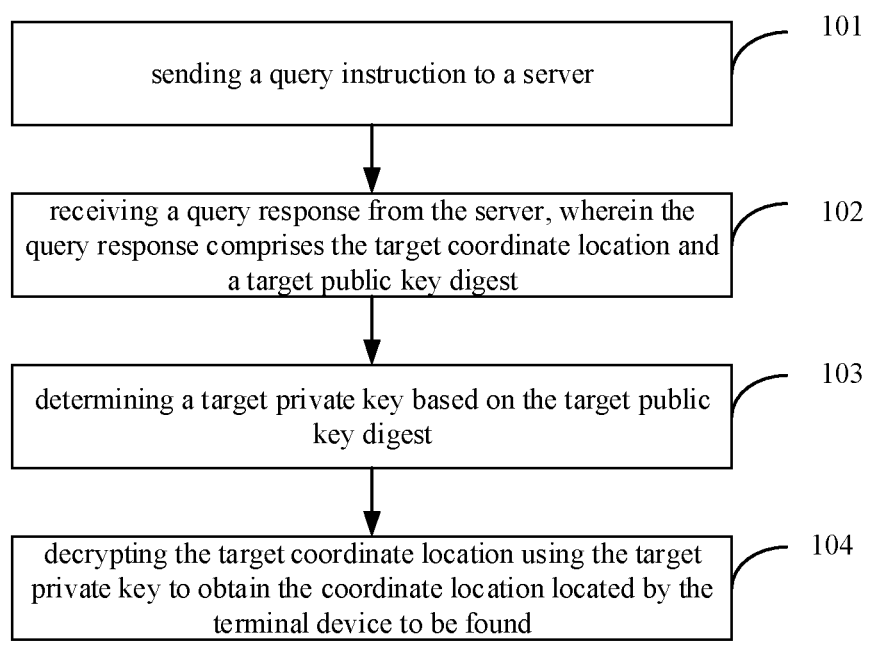
FIG. 1 is a flowchart of a method for positioning a terminal device according to an embodiment of the disclosure.

FIG. 1 is a flowchart of a method for positioning a terminal device according to an embodiment of the disclosure. The method for positioning a terminal device may be applicable to a first terminal device.

As illustrated in FIG. 1, the method for positioning a terminal device may include the following steps.

Step 101, a query instruction is sent to a server.

In some embodiments of the disclosure, the first terminal device (a finding device) may send the query instruction to the server in a wired or wireless manner. The query instruction is configured to query a target coordinate location of a terminal device to be found (a device to be found).

Step 102, a query response is received from the server, in which the query response includes the target coordinate location and a target public key digest.

Further, after the server receives the query instruction sent by the first terminal device, the server may send the query response to the first terminal device, in which the query response includes the target coordinate location and the target public key digest, the target coordinate location is obtained by encrypting a coordinate location positioned by the terminal device itself, and the target coordinate location is sent to the server synchronously with the target public key digest.

That is to say, the terminal device to be found sends the target public key digest to the server. After receiving the target public key digest, the server matches the target public key digest with at least one public key digest in the server, to determine a target public key based on the public key digest that matches the target public key digest, and to send the target public key to the terminal device to be found. The terminal device to be found uses the target public key to encrypt its own coordinate location to obtain the target coordinate location. The terminal device to be found sends the target coordinate location and the target public key digest to the server synchronously. The server determines the first terminal device based on the target public key digest, and sends the target public key digest and the target coordinate location to the first terminal device. It should be noted that, when the terminal to be found has sending and receiving functions, the terminal to be found may be the terminal device to be found, and when the terminal to be found only has a sending function and does not have a receiving function, the terminal device to be found may be a relay device.

Step 103, a target private key is determined based on the target public key digest.

Further, the public key matching the target public key digest may be determined based on the target public key digest. The target private key may be determined based on the public key matching the target public key digest.

Step 104, the target coordinate location is decrypted using the target private key to obtain the coordinate location located by the terminal device to be found.

In some embodiments of the disclosure, the target coordinate location is decrypted using the target private key, and the decrypted coordinate location is the coordinate location located by the terminal device to be found.

In conclusion, the query instruction is sent to the server and the query response is received from the server. Thus, the target coordinate location encrypted by the terminal device to be found and the target public key digest may be obtained from the server. The target public key digest is used to determine the target private key. The target private key is used to decrypt the target coordinate location. Therefore, only the first terminal device may use the target private key to decrypt the target coordinate location to obtain the coordinate location of the terminal device to be found, the server may not decrypt the target coordinate location of the terminal device to be found, and other terminal devices may not illegally obtain the location of the terminal device to be found from the server, so that the location of the terminal device to be found will not be leaked, improving the security of the location of the terminal device to be found and the rate of being found by the user for the terminal device to be found, and improving the user experience.

Figure 2:
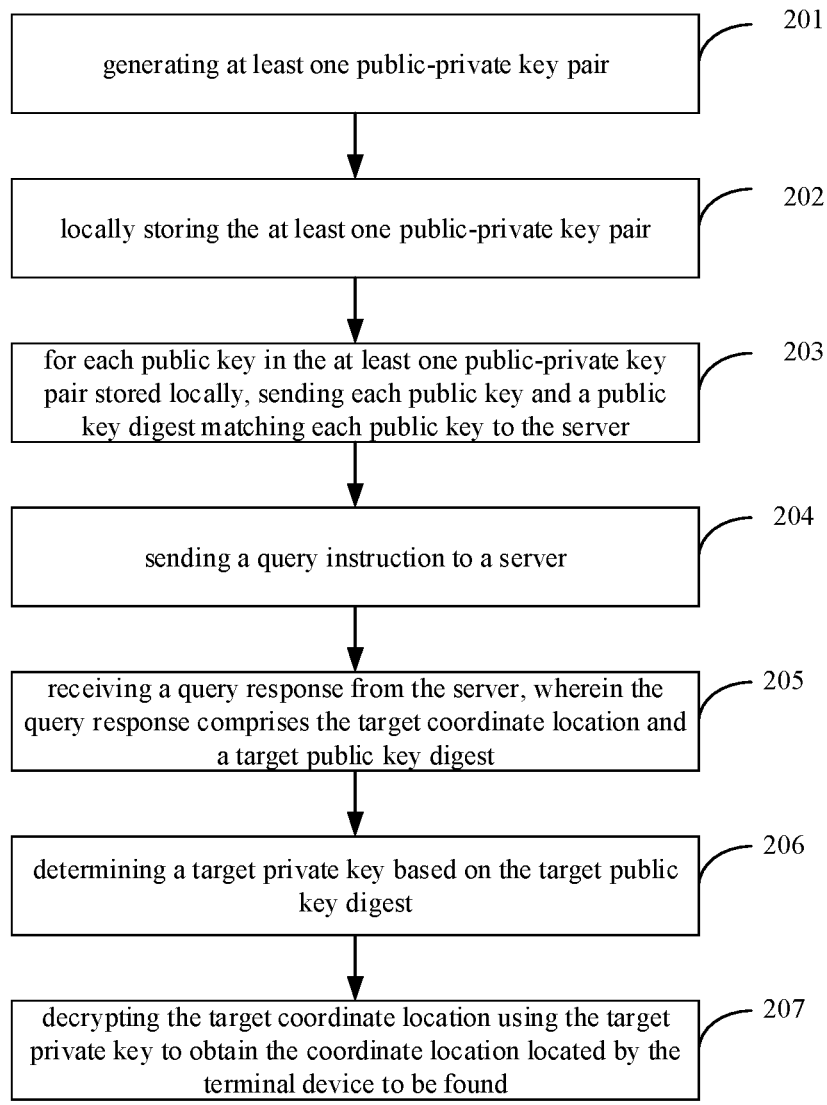
FIG. 2 is a flowchart of a method for positioning a terminal device according to an embodiment of the disclosure.

In order that when the server receives the target public key digest sent by the terminal device to be found, the target public key matching the target public key digest may be determined and sent to the terminal device to be found, as illustrated in FIG. 2. FIG. 2 is a flowchart of a method for positioning a terminal device according to an embodiment of the disclosure. The method for positioning a terminal device is applicable to a first terminal device. In some embodiments of the disclosure, before sending the query instruction to the server, the first terminal device may send each public key in at least one public-private key pair locally stored and a public key digest matching each public key to the server. Some embodiments in FIG. 2 may include the following steps.

Step 201, at least one public-private key pair is generated.

In some embodiments of the disclosure, the first terminal device may randomly generate the at least one public-private key pair, in which a public key and a private key in each public-private key pair of the at least one public-private key pair have a one-to-one correspondence.

Step 202, the at least one public-private key pair is locally stored.

Further, the at least one public-private key pair generated is stored locally.

Step 203, for each public key of the at least one public-private key pair stored locally, each public key and a public key digest matching each public key are sent to the server.

Optionally, for each public key of the at least one public-private key pair locally stored, the public key digest matching each public key is determined; and in response to a launching instruction, each public key and the public key digest matching each public key are sent to the server. It should be noted that, before sending the public key and the public key digest to the server, the public key digest matching each public key may be preset in a second terminal device or a third terminal device. The second terminal device is a terminal device with receiving and sending functions or a terminal device only with a sending function.

That is to say, for each public key of the at least one public-private key pair stored locally, a preset digest algorithm (such as SHA-256) may be used to calculate a digest of each public key, and the obtained digest may be used as the public key digest corresponding to each public key. When the user turns on a preset mode for the first terminal device (for example, a lost mode), the first terminal device may send each public key and the public key digest matching each public key to the server. Furthermore, when receiving the target public key digest sent by the terminal device to be found, the server may match the target public key digest with the public key digest matching each public key, and according to the public key digest matching the target public key digest, determine the target public key matching the target public key digest from at least one public key of the at least one public-private key pair, and sent to the terminal device to be found.

Figure 3:
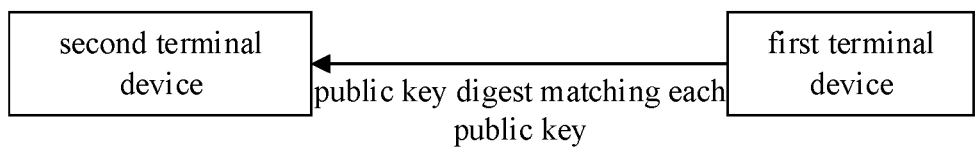
FIG. 3 is a schematic diagram of pairing a first terminal device and a second terminal device according to an embodiment of the disclosure.

It should be noted that, before sending the public key and the public key digest to the server, the public key digest matching each public key may be preset in the second terminal device or the third terminal device. As illustrated in FIG. 3, before the first terminal device sends each public key and the public key digest matching each public key to the server, the first terminal device may be paired with the second terminal device or the third terminal device. In some embodiments of the disclosure, the public key digest matching each public key is sent to the second terminal device or the public key digest matching each public key is set in the third terminal device.

Step 204, a query instruction is sent to a server.

Step 205, a query response is received from the server, in which the query response includes the target coordinate location and a target public key digest.

Step 206, a target private key is determined based on the target public key digest.

In some embodiments of the disclosure, a public key matching the target public key digest may be determined of the at least one public-private key pair according to the target public key digest, and further, according to the public key matching the target public key digest, the target private key is obtained by querying the at least one public-private key pair.

Step 207, the target coordinate location is decrypted using the target private key to obtain the coordinate location located by the terminal device to be found.

It should be noted that the execution processes of steps 204 to 205 and step 207 may be implemented in any of embodiments of the disclosure, which are not limited in embodiments of the disclosure, and will not be described again.

In conclusion, before sending the query instruction to the server, the first terminal device sends each public key of the at least one public-private key pair locally stored and the public key digest matching each public key to the server. Thereby, when the server receives the target public key digest sent by the terminal device to be found, it may determine the target public key that matches the target public key digest and send it to the terminal device to be found. After the terminal device to be found verifies the target public key, the terminal device to be found encrypts the coordinate location located by itself according to the target public key, which improves the security of the target coordinate location of the terminal device to be found.

The method for positioning a terminal device according to embodiments of the disclosure is applicable to the first terminal device. The query instruction is sent to the server, in which the query instruction is configured to query the target coordinate location of the terminal device to be found; the query response is received from the server, in which the query response includes the target coordinate location and the target public key digest, the target coordinate location is obtained by encrypting the coordinate location positioned by the terminal device itself, and the target coordinate location is sent to the server synchronously with the target public key digest; the target private key is determined based on the target public key digest; and the target coordinate location is decrypted using the target private key to obtain the coordinate location located by the terminal device to be found. With the method, the query instruction is sent to the server and the query response is received from the server. Thus, the target coordinate location encrypted by the terminal device to be found and the target public key digest may be obtained from the server. The target public key digest is used to determine the target private key. The target private key is used to decrypt the target coordinate location. Therefore, only the first terminal device may use the target private key to decrypt the target coordinate location to obtain the coordinate location of the terminal device to be found, the server may not decrypt the target coordinate location of the terminal device to be found, and other terminal devices may not illegally obtain the location of the terminal device to be found from the server, so that the location of the terminal device to be found will not be leaked, improving the security of the location of the terminal device to be found and the rate of being found by the user for the terminal device to be found, and improving the user experience.

In order to implement the above embodiments, the disclosure also proposes another method for positioning a terminal device.

Figure 4:
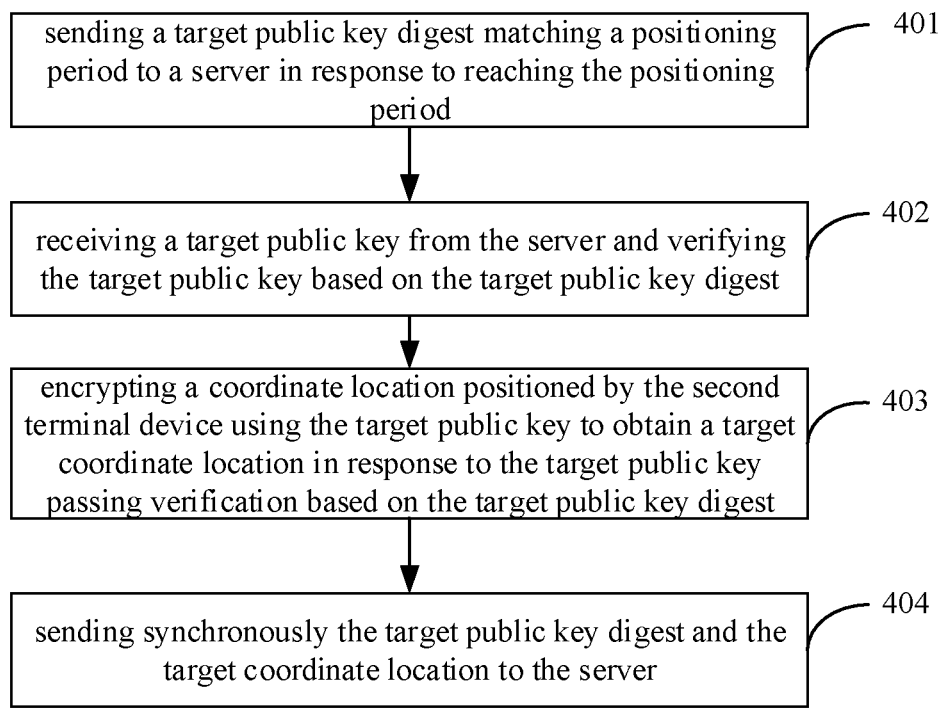
FIG. 4 is a flowchart of a method for positioning a terminal device according to an embodiment of the disclosure.

FIG. 4 is a flowchart of a method for positioning a terminal device according to an embodiment of the disclosure. The method for positioning a terminal device is applicable to a second terminal device. The second terminal device may be a terminal device having a sending function and a receiving function, for example, the second terminal device is a mobile terminal (e.g., a mobile phone).

As illustrated in FIG. 4, the method for positioning a terminal device includes the following steps.

Step 401, a target public key digest matching a positioning period is sent to a server in response to reaching the positioning period.

In some embodiments of the disclosure, whenever a positioning period is reached, the second terminal device may determine the target public key digest matching the current positioning period from at least one public key digest sent by the first terminal device.

The positioning period may be determined according to the number of the at least one public key digest received from the first terminal device. For example, the number of public key digests sent by the first terminal device to the second terminal device is 1000. If the maintenance time that the second terminal device sends the public key digests to the server is 10 days, the second terminal device may send the target public key digest to the server 100 times one day, and the minimum value of the positioning period may be 15 minutes (the positioning period is 15 minutes, the second terminal device may send 96 public key digests to the server within one day, and the second terminal device may send 960 public key digests to the server within 10 days. The 960 public key digests may be within the range 1000 of the number of public key digests that may be sent to the server by the second terminal device).

Step 402, a target public key is received from the server and the target public key is verified based on the target public key digest.

In some embodiments of the disclosure, after the server receives the target public key digest that is sent by the second terminal device in the current positioning period and matches the current positioning period, the server may match at least one public key digest previously sent by the first terminal device with the target public key digest, and determine, based on the matched public key digest, the target public key that matches the target public key digest from at least one public key previously received from the first terminal device. It should be noted that, before the first terminal device sends the query instruction to the server, the first terminal device sends each public key in at least one public-private key pair stored locally and the public key matching each public key to the server.

Furthermore, after receiving the target public key sent by the server, a preset digest algorithm (such as SHA-256) may be used to calculate a digest of the target public key, and the digest of the target public key is compared with the target public key digest. When the target public key digest matches the digest of the target public key, it may be determined that the target public key passes the verification of the target public key digest, that is, the target public key sent by the server has not been tampered with.

Step 403, a coordinate location positioned by the second terminal device is encrypted using the target public key to obtain a target coordinate location in response to the target public key passing verification based on the target public key digest.

Further, when the target public key is verified successfully based on the target public key digest, the target public key may be used to encrypt the location where the second terminal device is located, and the encrypted coordinate location is used as the target coordinate location.

Step 404, the target public key digest and the target coordinate location are sent to the server synchronously.

In some embodiments of the disclosure, the second terminal device synchronously sends the target public key digest and the target coordinate location to the server.

In conclusion, the corresponding target public key is obtained by periodically sending the public key digest to the server, and when the target public key passes the verification, the target public key is used to encrypt the coordinate location located by itself, which may avoid traceability. Furthermore, only the first terminal device may decrypt the target coordinate location using the target private key to obtain the coordinate location of the second terminal device, the server may not decrypt the target coordinate location of the second terminal device, and other terminal devices may not illegally obtain the location of the second terminal device from the server, so that the location of the second terminal device will not be leaked, improving the security of the location of the second terminal device and the rate of being found by the user for the second terminal device, and improving the user experience.

Figure 5:
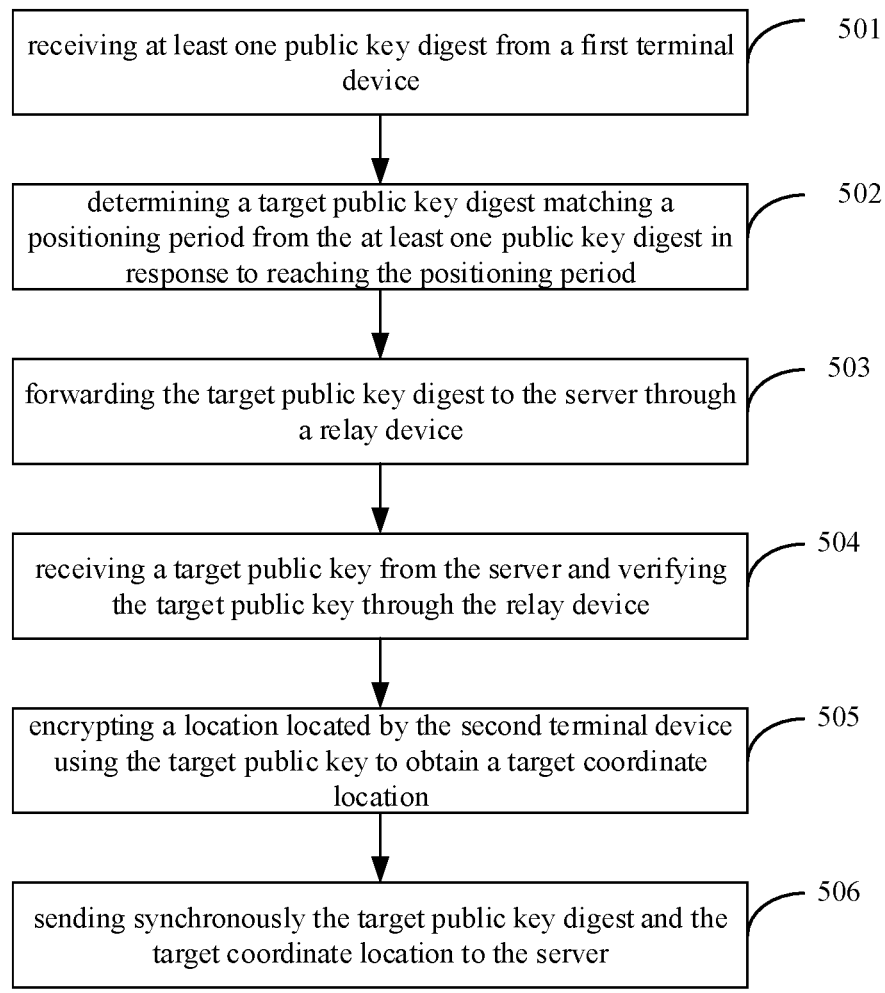
FIG. 5 is a flowchart of a method for positioning a terminal device according to an embodiment of the disclosure.

In order to accurately send the target public key digest matching the positioning period to the server in the positioning period, as illustrated in FIG. 5, FIG. 5 is a flowchart of a method for positioning a terminal device according to an embodiment of the disclosure. In some embodiments, at least one public key digest sent by the first terminal device may be received before the target public key digest matching the current positioning period is sent to the server in the current positioning period, so that when the positioning period is reached, the target public key digest matching the current positioning period may be determined from the at least one public key digest, and the determined target public key digest is sent to the server. The embodiment in FIG. 5 may include the following steps.

Step 501, at least one public key digest is received from the first terminal device.

In some embodiments of the disclosure, before the first terminal device sends a query instruction to the server, the first terminal device may determine the public key digest matching each public key of the at least one public-private key pair stored locally by a preset digest algorithm, and send the public key digest matching each public key to the second terminal device, so that the second terminal device may receive the at least one public key digest sent by the first terminal device.

Step 502, a target public key digest matching a positioning period is determined from the at least one public key digest in response to reaching the positioning period.

Optionally, a number of periods between the positioning period and an initial positioning period is determined; and the target public key digest matching the positioning period is determined based on the number of periods, in which there is a corresponding relationship between various positioning periods and the at least one public key digest.

That is to say, each positioning period may be determined based on the number of public key digests sent by the first terminal device to the second terminal device and the maintenance time that the second terminal device sends the public key digests to the server, in which the corresponding relationship may be set between each positioning period and the at least one public key digest (for example, the public key digests may be arranged in the order of generation time, and various positioning periods are in a one-to-one correspondence with the arranged public key digests). Further, whenever the positioning period is reached, the number of periods between the current positioning period and the initial positioning period may be determined. Based on the number of periods, the target public key digest matching this positioning period may be determined. For example, within the initial positioning period, the first public key digest in the arranged public key digests may be sent, the number of periods between the current positioning period and the initial positioning period is 3, and within this positioning period, the fourth (the number of periods plus 1) in the arranged public key digests may be sent).

Step 503, the target public key digest is forwarded to the server through a relay device.

In some embodiments of the disclosure, when the second terminal device sends the target public key digest to the server, it may forward the target public key digest to the server through the relay device.

Step 504, a target public key sent by the server is verified and received through the relay device.

In some embodiments of the disclosure, the relay device may receive the target public key sent by the server, and use the forwarded target public key digest to verify the target public key, and forward the target public key when the target public key is verified successfully.

In addition, the second terminal device may also directly receive the target public key sent by the server, and use the target public key digest to verify the target public key. The disclosure is merely illustrative, and not specifically limited.

Step 505, a location where the second terminal device is located is encrypted the using the target public key to obtain a target coordinate location.

It should be noted that, after passing the verification of the target public key, the relay device may also use the target public key to encrypt the coordinate location it locates to obtain the target coordinate location. The disclosure is merely illustrative, and not specifically limited.

Step 506, the target public key digest and the target coordinate location are sent to the server synchronously.

It should be noted that the execution processes of steps 505 to 506 may be implemented in any of various embodiments of the disclosure, which is not limited in embodiments of the disclosure, and will not be described again.

In conclusion, the at least one public key digest is received from the first terminal device; the target public key digest matching the positioning period is determined from the at least one public key digest in response to reaching the positioning period; the target public key digest is forwarded to the server through the relay device; and the target public key sent by the server is verified and received through the relay device, so that the relay device may accurately send the target public key digest matching the positioning period to the server during the positioning period, and verify and forward the target public key sent by the server, so that the second terminal device uses the target public key to encrypt the location, which may improve the security of the location of the second terminal device.

Figure 6:
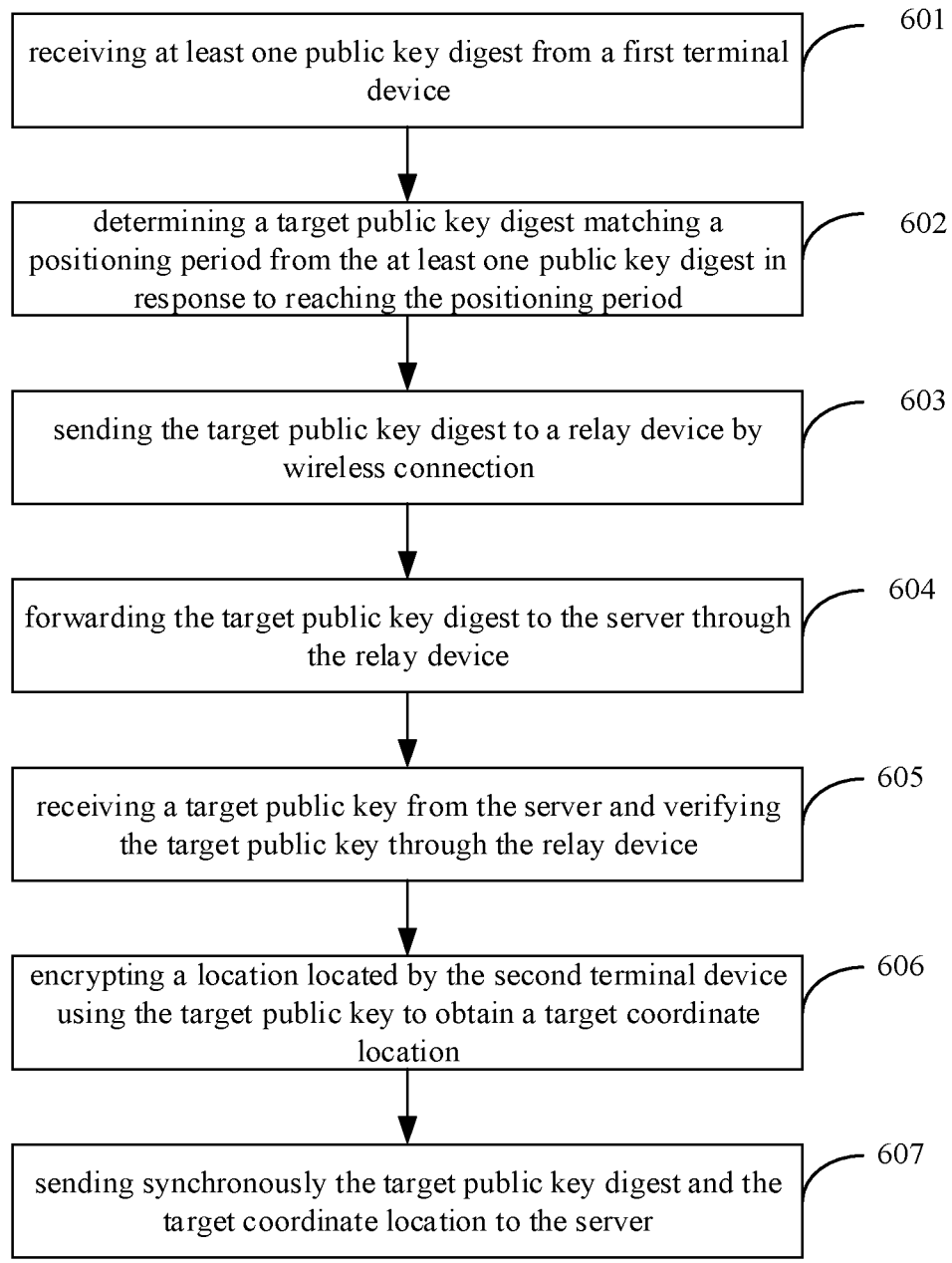
FIG. 6 is a flowchart of a method for positioning a terminal device according to an embodiment of the disclosure.

In order to accurately forward the public key digest matching the positioning period to the server through the relay device and reduce capability requirements of the second terminal device, as illustrated in FIG. 6, FIG. 6 is a flowchart of a method for positioning a terminal device according to an embodiment of the disclosure. In some embodiments of the disclosure, the second terminal device may send the target public key digest matching the positioning period to the relay device by wireless connection, and forward the target public key digest to the server through the relay device. The embodiment in FIG. 6 may include the following steps.

Step 601, at least one public key digest is received from the first terminal device.

Step 602, a target public key digest matching a positioning period is determined from the at least one public key digest in response to reaching the positioning period.

Step 603, the target public key digest is sent to the relay device by wireless connection.

For example, the target public key digest may be sent to the relay device by using Bluetooth, in which the second terminal device may flexibly determine the byte length of the Bluetooth broadcast. For example, the byte length of the Bluetooth broadcast may be determined based on the number of the second mobile devices (the mobile devices to be found) and a collision probability between the second mobile device and other second terminal devices. For example, during the positioning period, the device ID of each Bluetooth broadcast is different, and each second terminal device may obtain other second terminals for broadcasting. When the number of the second terminal terminals for Bluetooth broadcast is large and the collision probability between the Bluetooth broadcasted by the second terminal terminals is high, the byte length of the Bluetooth broadcast may be increased. For another example, when the number of the second terminal terminals for Bluetooth broadcast is small and the collision probability between the Bluetooth broadcasted by the second terminal terminals is small, the byte length of the Bluetooth broadcast may be reduced.

Step 604, the target public key digest is forwarded to the server through the relay device.

Furthermore, after receiving the target public key digest sent by the second terminal device, the relay device may forward the target public key digest to the server.

Step 605, a target public key sent by the server is verified and received through the relay device.

Step 606, a location where the second terminal device is located is encrypted the using the target public key to obtain a target coordinate location.

Step 607, the target public key digest and the target coordinate location are sent to the server synchronously.

It should be noted that the execution processes of steps 601 to 602 and steps 605 to 607 may be implemented in any of various embodiments of the disclosure, which are not limited in embodiments of the disclosure, and will not be described again.

In conclusion, the target public key digest is sent to the relay device using the wireless connection manner, the target public key digest is forwarded to the server through the relay device, so that the server may accurately receive the target public key digest sent by the second terminal device, and the second terminal device only needs to have certain storage and wireless broadcasting capabilities, which reduces the capability requirements of the second terminal device.

The method for positioning a terminal device according to embodiments of the disclosure is applicable to the second terminal device. The target public key digest matching the positioning period is sent to the server in response to reaching the positioning period, and the target public key is received from the server and the target public key is verified based on the target public key digest; the coordinate location positioned by the second terminal device is encrypted using the target public key to obtain the target coordinate location in response to the target public key passing verification based on the target public key digest; and target public key digest and the target coordinate location are sent to the server synchronously. The corresponding target public key is obtained by periodically sending the public key digest to the server, and when the target public key passes the verification, the target public key is used to encrypt the coordinate location located by itself, which may avoid traceability. Furthermore, only the first terminal device may decrypt the target coordinate location using the target private key to obtain the coordinate location of the second terminal device, the server may not decrypt the target coordinate location of the second terminal device, and other terminal devices may not illegally obtain the location of the second terminal device from the server, so that the location of the second terminal device will not be leaked, improving the security of the location of the second terminal device and the rate of being found by the user for the second terminal device, and improving the user experience.

In order to implement the above embodiments, the disclosure also proposes another method for positioning a terminal device.

Figure 7:
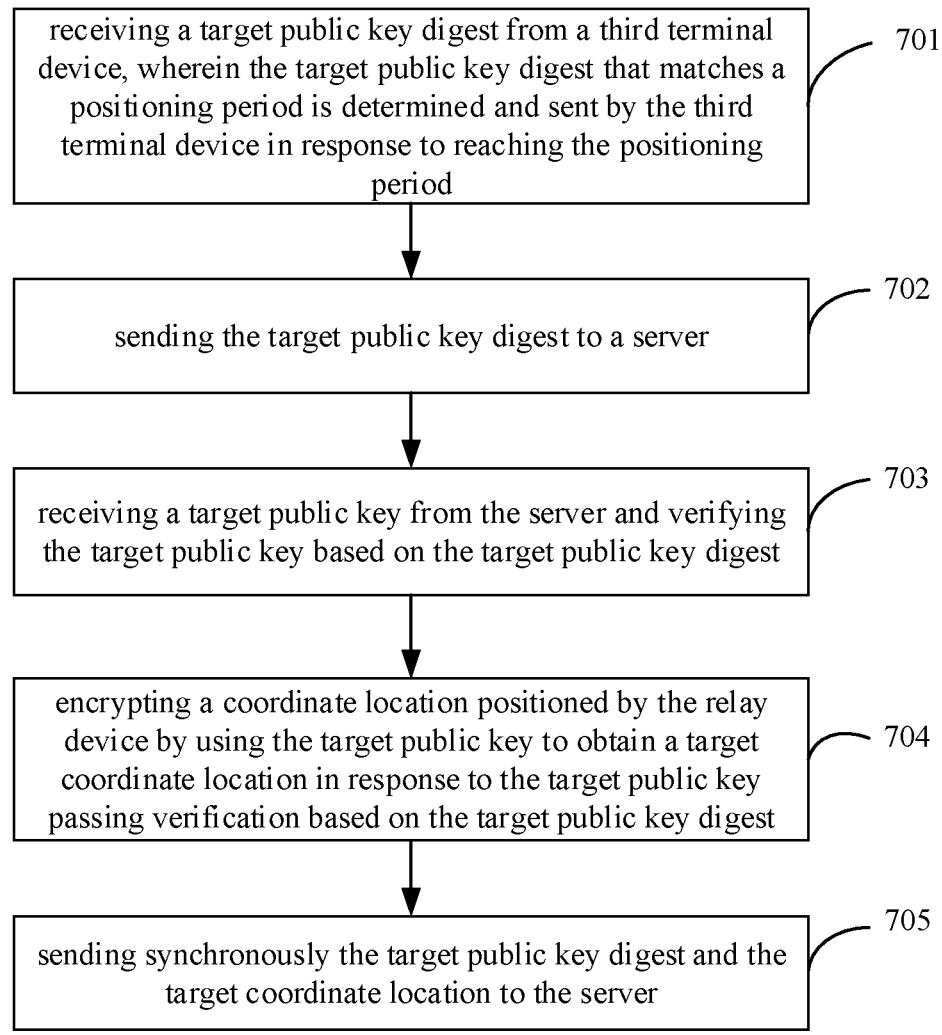
FIG. 7 is a flowchart of a method for positioning a terminal device according to an embodiment of the disclosure.

FIG. 7 is a flowchart of a method for positioning a terminal device according to an embodiment of the disclosure. The method for positioning a terminal device is applicable to a relay device.

As illustrated in FIG. 7, the method for positioning a terminal device includes the following steps.

Step 701, a target public key digest is received from a third terminal device, in which the target public key digest that matches a positioning period is determined and sent by the third terminal device in response to reaching the positioning period.

In some embodiments of the disclosure, the third terminal device may determine, from at least one public key digest, the target public key digest matching the current positioning period and send it to the relay device when the positioning period is reached.

The positioning period may be determined based on the number of at least one public key digest preset in the third terminal device. For example, the number of public key digests preset in the third terminal device is 1000, the maintenance time that the third terminal device sends the public key digest to the relay device is 10 days, the third terminal device may send 100 target public key digests to the relay device every day, and the minimum value of the positioning period may be 15 minutes (the positioning period is 15 minutes, the third terminal device may send 96 public key digests to the relay device within one day, and the third terminal device may send 960 public key digests to the relay device within 10 days. The 960 public key digests may be within the range 1000 of the number of public key digests preset in the third terminal device).

Step 702, the target public key digest is sent to the server.

Further, the relay device forwards the received target public key digest sent by the third terminal device to the server.

Step 703, a target public key from the server is received and verified based on the target public key digest.

In some embodiments of the disclosure, after receiving the target public key digest sent by the relay device, the server matches the received at least one public key digest previously sent by the first terminal device with the target public key digest. Based on the matched public key digest, the target public key that matches the target public key digest may be determined from the received at least one public key previously sent by the first terminal device. It should be noted that, before sending the query instruction to the server, the first terminal device may send each public key in at least one public-private key pair locally stored and a public key digest matching each public key to the server.

Furthermore, after receiving the target public key sent by the server, a preset digest algorithm (such as SHA-256) may be used to calculate a digest of the target public key, and the digest of the target public key is compared with the target public key digest. When the digest of the target public key matches the target public key digest, it may be determined that the target public key passes the verification of the target public key digest, that is, the target public key sent by the server has not been tampered with.

Step 704, a coordinate location positioned by the relay device is encrypted by using the target public key to obtain a target coordinate location in response to the target public key passing verification based on the target public key digest.

Further, when the target public key passes verification based on the target public key digest, the target public key may be used to encrypt the coordinate location located by the relay device, and the encrypted coordinate location is used as the target coordinate location.

Step 705, the target public key digest and the target coordinate location are sent synchronously to the server.

In some embodiments of the disclosure, the relay device synchronously sends the target public key digest and the target coordinate location to the server.

The method for positioning a terminal device according to embodiments of the disclosure is applicable to the relay device. The target public key digest is received from the third terminal device, in which the target public key digest that matches a positioning period is determined and sent by the third terminal device in response to reaching the positioning period; the target public key digest is sent to the server; the target public key from the server is received and verified based on the target public key digest; the coordinate location positioned by the relay device is encrypted by using the target public key to obtain the target coordinate location in response to the target public key passing verification based on the target public key digest; and the target public key digest and the target coordinate location are sent synchronously to the server, so that the relay device may forward the target public key digest sent by the third terminal device, verify the target public key sent by the server, encrypt the location positioned by the target public key, which improves the security of the location of the third terminal device and a rate of being found by the user, and improves the user experience. At the same time, only the third terminal device is required to have certain storage and wireless broadcasting capabilities, which reduces capability requirements of the third terminal device.

In order to implement the above embodiments, the disclosure also proposes another method for positioning a terminal device.

Figure 8:
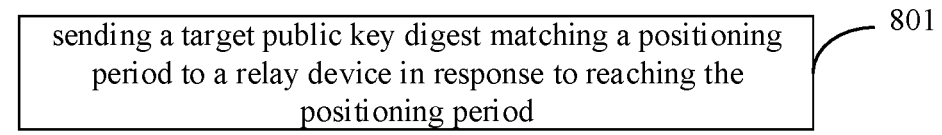
FIG. 8 is a flowchart of a method for positioning a terminal device according to an embodiment of the disclosure.

FIG. 8 is a flowchart of a method for positioning a terminal device according to an embodiment of the disclosure. The method for positioning a terminal device is applicable to a third terminal device.

The embodiment in FIG. 8 may include the following steps.

Step 801, a target public key digest matching a positioning period is sent to a relay device in response to reaching the positioning period.

In some embodiments of the disclosure, when the third terminal device reaches the positioning period, it may send the target public key digest matching the positioning period to the relay device.

The target public key digest is configured to, at the relay device, send the target public key digest to a server, verify a target public key in response to receiving the target public key from the server, encrypt a coordinate location positioned by the relay device by using the target public key to obtain a target coordinate location in response to the target public key passing verification based on the target public key digest, and send synchronously the target public key digest and the target coordinate location to the server.

That is to say, after the relay device receives the target public key digest sent by the third terminal device, the relay device may forward the target public key digest to the server. The server may determine the target public key that matches the target public key digest and send the target public key to the relay device. The relay device may use the target public key digest to verify the target public key. If the target public key verification passes, the relay device uses the target public key to encrypt its location to obtain the target coordinate location, and then the relay device synchronously sends the target public key digest and the target coordinate location to the server. The server sends the target coordinate location and the target public key digest to the first terminal device. The first terminal device, based on the target public key digest, determine the target private key, use the target private key to decrypt the target coordinate location to obtain the coordinate location of the relay device. According to the coordinate location of the relay device, because the third terminal device usually uses Bluetooth to send the target public key digest, the coordinate location of the third terminal device can be determined after the position of the relay device is determined.

The method for positioning a terminal device according to embodiments of the disclosure is applicable to the third terminal device. The target public key digest matching a positioning period is sent to a relay device in response to reaching the positioning period. The target public key digest is configured to, at the relay device, send the target public key digest to a server, verify a target public key in response to receiving the target public key from the server, encrypt a coordinate location positioned by the relay device by using the target public key to obtain a target coordinate location in response to the target public key passing verification based on the target public key digest, and send synchronously the target public key digest and the target coordinate location to the server. In this way, the third terminal device forwards the target public key digest to the server through the relay device, and the relay device may also verify the target public key sent by the server, and use the target public key to encrypt the location positioned, so as to improve the security of the location of the third terminal device and the rate of being found by the user, and further improve the user experience. At the same time, only the third terminal device is required to have certain storage and wireless broadcasting capabilities, which reduces the requirements of the third terminal device.

In order to implement the above embodiments, the disclosure also proposes another method for positioning a terminal device.

Figure 9:
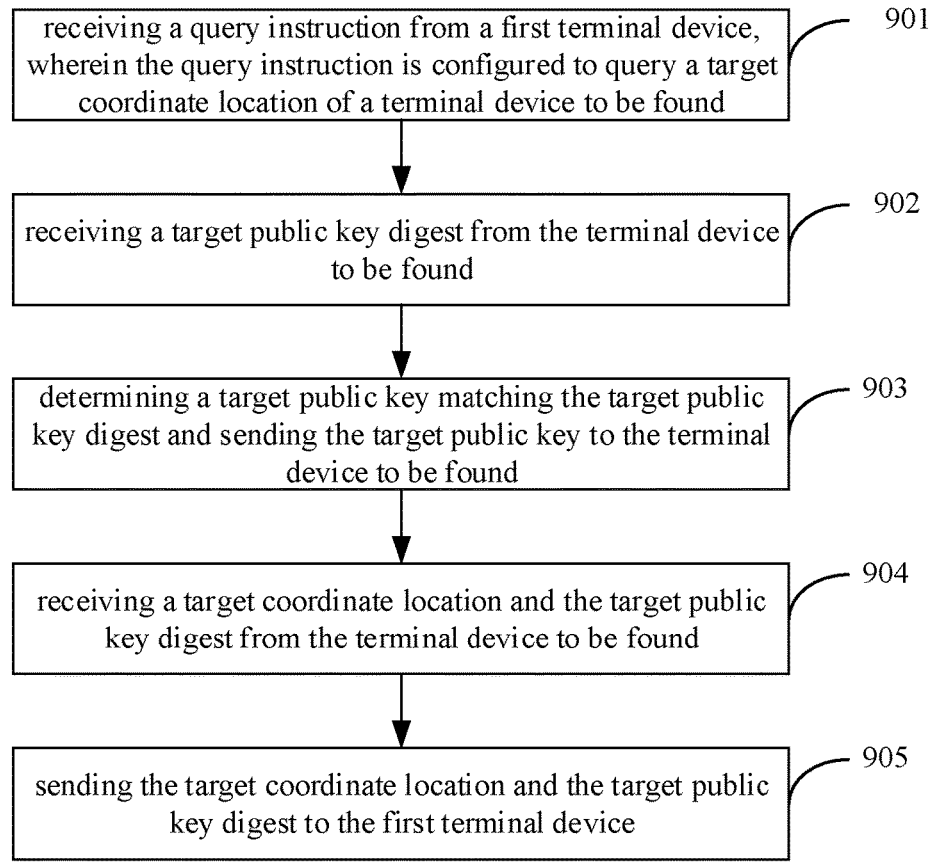
FIG. 9 is a flowchart of a method for positioning a terminal device according to an embodiment of the disclosure.

FIG. 9 is a flowchart of a method for positioning a terminal device according to an embodiment of the disclosure. The method for positioning a terminal device is applicable to a server.

As illustrated in FIG. 9, the method for positioning a terminal device may include the following steps.

Step 901, a query instruction from a first terminal device is received, in which the query instruction is configured to query a target coordinate location of a terminal device to be found.

In some embodiments of the disclosure, the first terminal device may send the query instruction to the server in a wired or wireless manner, in which the query instruction is configured to query the target coordinate location of the terminal device to be found (the device to be found). When the terminal device to be found is a terminal device with sending and receiving functions, the terminal device to be found may be the device to be found (for example, a second terminal device). When the terminal device to be found only has a sending function and does not have a receiving function, the terminal device to be found may be a relay device.

It should be noted that, before the first terminal device sends the query instruction to the server, each public key of the at least one public-private key pair locally stored and a public key digest matching each public key may be sent to the server.

Step 902, a target public key digest from the terminal device to be found is received.

As an example, when the terminal device to be found is the second terminal device, the second terminal device may send the target public key digest matching the current positioning period to the server in response to reaching the current positioning period.

Optionally, the second terminal device may determine the target public key digest matching the current positioning period from at least one public key digest sent by the first terminal device in response to reaching the current positioning period. As another example, when the device to be found is a terminal device without a receiving function (such as a Bluetooth headset), the terminal device to be found may be a relay device, and the third terminal device may send the target public key digest that matches the current positioning period to the relay device in response to reaching the current positioning period, and the relay device may forward the target public key digest to the server.

Step 903, a target public key matching the target public key digest is determined and sent to the terminal device to be found.

Further, when receiving the target public key digest sent by the terminal device to be found, the server may determine the target public key from at least one public key in at least one public-private key pair according to the public key digest matched with each public key and sends it to the terminal device to be found.

Step 904, a target coordinate location and the target public key digest are received from the terminal device to be found, in which the target coordinate location is obtained by encrypting a coordinate location located by the terminal device to be found using the target public key in response to the target public key passes verification based on the target public key digest.

In some embodiments of the disclosure, when the verification of the target public key based on the target public key digest passes, the terminal device to be found uses the target public key to encrypt the location positioned by the terminal device to be found to obtain the target coordinate location, and then send the target coordinate location and the target public key digest to the server synchronously. The server may receive the target coordinate location and target public key digest sent by the terminal device to be found.

Step 905, the target coordinate location and the target public key digest are sent to the first terminal device.

Furthermore, the server may determine the corresponding first terminal device based on the target public key digest and send the target coordinate location and the target public key digest to the first terminal device. The public key matching the target public key digest may be determined in at least one public-private key pair, and then, according to the public key matching the target public key digest, at least one public-private key pair may be queried to obtain the target private key, and the first mobile device may use the target private key to decrypt the target coordinate location to obtain the coordinate location of the terminal device to be found.

The method for positioning a terminal device according to embodiments of the disclosure is applicable to the server. The query instruction from the first terminal device is received, in which the query instruction is configured to query the target coordinate location of a terminal device to be found; the target public key digest from the terminal device to be found is received; the target public key matching the target public key digest is determined and sent to the terminal device to be found; and the target coordinate location and the target public key digest are sent to the first terminal device. Therefore, only the first terminal device may decrypt the target coordinate location using the target private key, the server may not decrypt the target coordinate location of the terminal device to be found, and other terminal devices may not illegally obtain the location of the terminal device to be found from the server, so that the location of the terminal device to be found will not be leaked, and the security of the location of the terminal device to be found and the rate of being found by the user are improved, which improves the user experience.

In order to illustrate the above-mentioned embodiments more clearly, examples will now be described.

Figure 10:
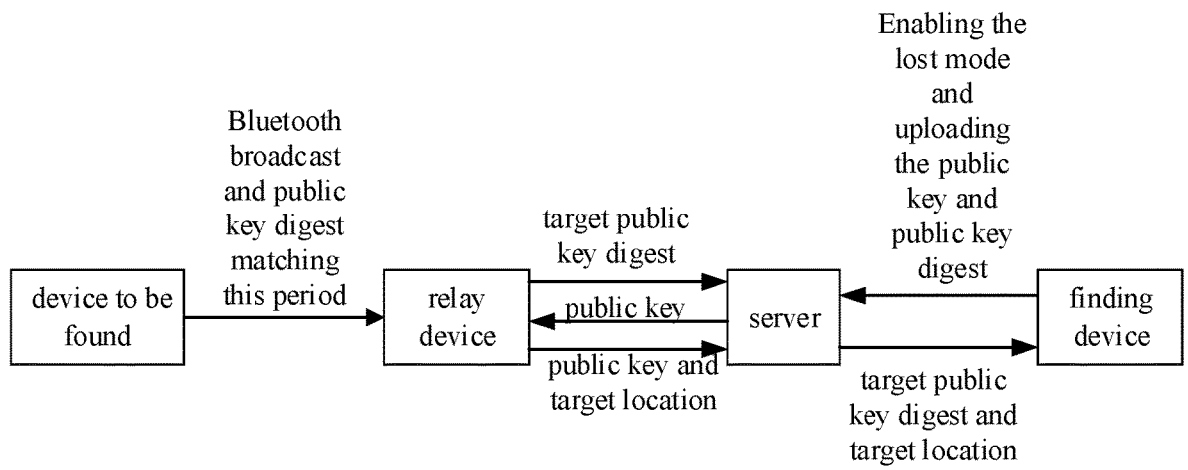
FIG. 10 is a flowchart of a method for positioning a terminal device according to an embodiment of the disclosure.

For example, as illustrated in FIG. 10, taking the first terminal device as the finding device and the third terminal device as the device to be found as an example. After the finding device turns on the lost mode, each public key and the public key digest matching each public key are sent to the server.

When the positioning period is reached, the device to be found may determine the target public key digest that matches the current positioning period from at least one public key digest sent by the finding device, and send the target public key digest to the server through the relay device. After receiving the target public key digest that matches the current positioning period and is sent by the device to be found in the positioning period, the server matches at least one public key digest sent by the searched device in advance with the target public key digest, and determine the target public key that matches the target public key digest, based on the matched public key digest, from the received at least one public key previously sent by the first terminal device, and then the server sends the target public key to the relay device. After the relay device uses the target public key digest to verify the target public key, and after the target public key verification is passed, the relay device may use the target public key to encrypt the location positioned itself and obtain the target coordinate location, and send the target public key digest and the target coordinate location to the server synchronously.

Further, the server determines the corresponding finding device according to the target public key digest, and sends the target coordinate location and the target public key digest to the finding device. According to the target public key digest, the finding device may determine the public key that matches the target public key digest from at least one public-private key pair, and then, according to the public key matching the target public key digest, query the target private key from at least one public-private key pair. The finding device may use the target private key to decrypt the target coordinate location to obtain the coordinate location of the relay device, and the coordinate location of the third terminal device may be determined according to the coordinate location of the relay device.

In order to implement the above embodiments in FIGS. 1 to 3, the disclosure further provides an apparatus for positioning a terminal device. The apparatus for positioning a terminal device may be applicable to a first terminal device.

Figure 11:
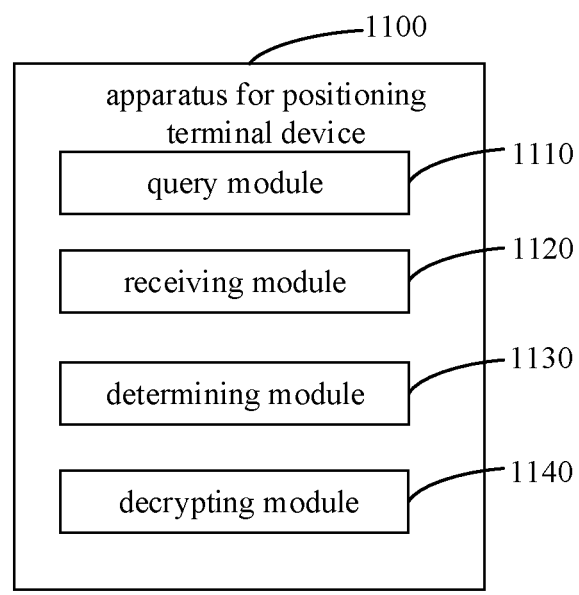
FIG. 11 is a block diagram of an apparatus for positioning a terminal device according to an embodiment of the disclosure.

FIG. 11 is a block diagram of an apparatus for positioning a terminal device according to an embodiment of the disclosure.

As illustrated in FIG. 11, the apparatus 1100 for positioning a terminal device includes: a query module 1110, a receiving module 1120, a determining module 1130 and a decrypting module 1140.

The query module 1110 is configured to send a query instruction to a server, in which the query instruction is configured to query a target coordinate location of a terminal device to be found; the receiving module 1120 is configured to receive a query response from the server, in which the query response includes the target coordinate location and a target public key digest, the target coordinate location is obtained by encrypting a coordinate location that is positioned for the terminal device to be found, and the target coordinate location is sent to the server as well as the target public key digest synchronously; the determining module 1130 is configured to determine a target private key based on the target public key digest; and the decrypting module 1140 is configured to decrypt the target coordinate location using the target private key to obtain the coordinate location located by the terminal device to be found.

As a possible implementation manner of embodiments of the disclosure, the apparatus 1100 further includes: a generating module, a storage module and a sending module.

The generating module is configured to generate at least one public-private key pair, in which a public key and a private key in each public-private key pair of the at least one public-private key pair have a one-to-one correspondence; the storage module is configured to locally store the at least one public-private key pair; and the sending module is configured to for each public key of the at least one public-private key pair stored locally, send each public key and a public key digest matching each public key to the server; in which each public key is configured to determine a target public key matching the target public key digest based on the public key digest matching each public key when the server receives the target public key digest from the terminal device to be found, and send the target public key to the terminal device to be found.

As a possible implementation manner of embodiments of the disclosure, the sending module is configured to, for each public key of the at least one public-private key pair stored locally, determine the public key digest matching each public key; and send each public key and the public key digest matching each public key to the server in response to a launching instruction.

The apparatus for positioning a terminal device according to embodiments of the disclosure is applicable to the first terminal device. The query instruction is sent to the server, in which the query instruction is configured to query the target coordinate location of the terminal device to be found; the query response is received from the server, in which the query response includes the target coordinate location and the target public key digest, the target coordinate location is obtained by encrypting the coordinate location positioned by the terminal device itself, and the target coordinate location is sent to the server synchronously with the target public key digest; the target private key is determined based on the target public key digest; and the target coordinate location is decrypted using the target private key to obtain the coordinate location located by the terminal device to be found. With the apparatus, the query instruction is sent to the server and the query response is received from the server. Thus, the target coordinate location encrypted by the terminal device to be found and the target public key digest may be obtained from the server. The target public key digest is used to determine the target private key. The target private key is used to decrypt the target coordinate location. Therefore, only the first terminal device may use the target private key to decrypt the target coordinate location to obtain the coordinate location of the terminal device to be found, the server may not decrypt the target coordinate location of the terminal device to be found, and other terminal devices may not illegally obtain the location of the terminal device to be found from the server, so that the location of the terminal device to be found will not be leaked, improving the security of the location of the terminal device to be found and the rate of being found by the user for the terminal device to be found, and improving the user experience.

In order to implement the above embodiments in FIGS. 4 to 6, the disclosure further provides another apparatus for positioning a terminal device. The apparatus for positioning a terminal device may be applicable to a second terminal device.

Figure 12:
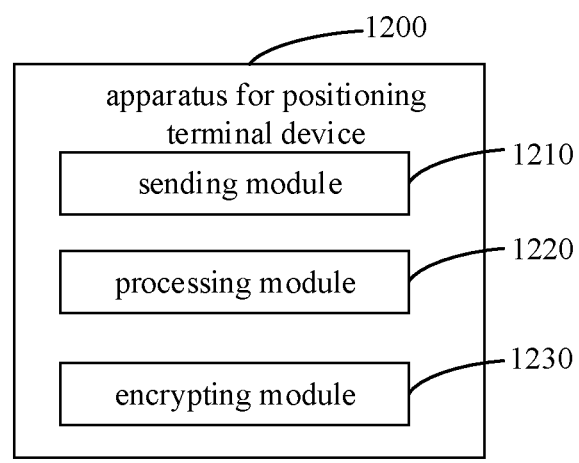
FIG. 12 is a block diagram of an apparatus for positioning a terminal device according to an embodiment of the disclosure.

As illustrated in FIG. 12, the apparatus 1200 for positioning a terminal device includes: a sending module 1210, a processing module 1220 and an encrypting module 1230.

The sending module 1210 is configured to send a target public key digest matching a positioning period to a server in response to reaching the positioning period; the processing module 1220 is configured to receive a target public key from the server and verify the target public key based on the target public key digest; and the encrypting module 12030 is configured to encrypt a coordinate location positioned by the second terminal device using the target public key to obtain a target coordinate location in response to the target public key passing verification based on the target public key digest; the sending module 1210 is further configured to send synchronously the target public key digest and the target coordinate location to the server.

As a possible implementation manner of embodiments of the disclosure, the apparatus 1200 further includes: a receiving module.

The receiving module is configured to receive at least one public key digest from a first terminal device. The sending module 1210 is configured to determine the target public key digest matching the positioning period from the at least one public key digest in response to reaching the positioning period; and forward the target public key digest to the server through a relay device.

As a possible implementation manner of embodiments of the disclosure, the sending module 1210 is configured to determine a number of periods between the positioning period and an initial positioning period; and determine the target public key digest matching the positioning period based on the number of periods, in which there is a corresponding relationship between various positioning periods and the at least one public key digest.

As a possible implementation manner of embodiments of the disclosure, the sending module 1210 is configured to send the target public key digest to the relay device by wireless connection; and forward the target public key digest to the server through the relay device.

The apparatus for positioning a terminal device according to embodiments of the disclosure is applicable to the second terminal device. The target public key digest matching the positioning period is sent to the server in response to reaching the positioning period, and the target public key is received from the server and the target public key is verified based on the target public key digest; the coordinate location positioned by the second terminal device is encrypted using the target public key to obtain the target coordinate location in response to the target public key passing verification based on the target public key digest; and target public key digest and the target coordinate location are sent to the server synchronously. The corresponding target public key is obtained by periodically sending the public key digest to the server, and when the target public key passes the verification, the target public key is used to encrypt the coordinate location located by itself, which may avoid traceability. Furthermore, only the first terminal device may decrypt the target coordinate location using the target private key to obtain the coordinate location of the second terminal device, the server may not decrypt the target coordinate location of the second terminal device, and other terminal devices may not illegally obtain the location of the second terminal device from the server, so that the location of the second terminal device will not be leaked, improving the security of the location of the second terminal device and the rate of being found by the user for the second terminal device, and improving the user experience.

In order to implement the above embodiments in FIG. 7, the disclosure further provides another apparatus for positioning a terminal device. The apparatus for positioning a terminal device may be applicable to a relay device.

Figure 13:
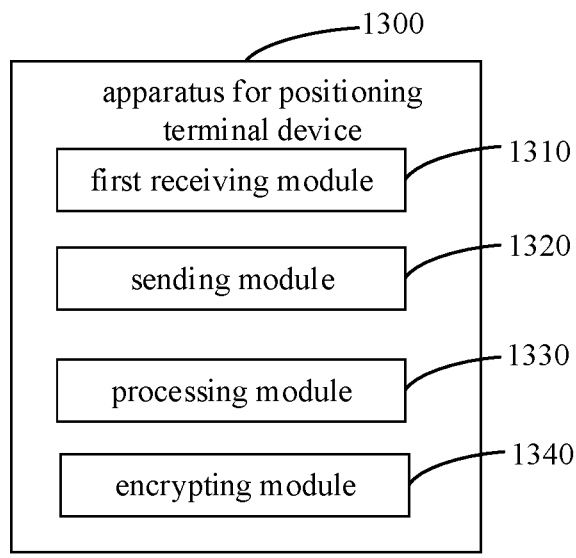
FIG. 13 is a block diagram of an apparatus for positioning a terminal device according to an embodiment of the disclosure.

As illustrated in FIG. 13, the apparatus 1300 includes: a first receiving module 1310, a sending module 1320, a processing module 1330 and an encrypting module 1340.

The first receiving module 1310 is configured to receive a target public key digest from a third terminal device, in which the target public key digest that matches a positioning period is determined and sent by the third terminal device in response to reaching the positioning period; the sending module 1320 is configured to send the target public key digest to a server; the processing module 1330 is configured to receive a target public key from the server and verify the target public key based on the target public key digest; and the encrypting module 1340 is configured to encrypt coordinate location positioned by the relay device by using the target public key to obtain a target coordinate location in response to the target public key passing verification based on the target public key digest; the sending module 1320 is further reconfigured to send synchronously the target public key digest and the target coordinate location to the server.

The apparatus for positioning a terminal device according to embodiments of the disclosure is applicable to the relay device. The target public key digest is received from the third terminal device, in which the target public key digest that matches a positioning period is determined and sent by the third terminal device in response to reaching the positioning period; the target public key digest is sent to the server; the target public key from the server is received and verified based on the target public key digest; the coordinate location positioned by the relay device is encrypted by using the target public key to obtain the target coordinate location in response to the target public key passing verification based on the target public key digest; and the target public key digest and the target coordinate location are sent synchronously to the server, so that the relay device may forward the target public key digest sent by the third terminal device, verify the target public key sent by the server, encrypt the location positioned by the target public key, which improves the security of the location of the third terminal device and a rate of being found by the user, and improves the user experience. At the same time, only the third terminal device is required to have certain storage and wireless broadcasting capabilities, which reduces capability requirements of the third terminal device.

In order to implement the above embodiments in FIG. 8, the disclosure further provides another apparatus for positioning a terminal device. The apparatus for positioning a terminal device may be applicable to a third terminal device.

Figure 14:
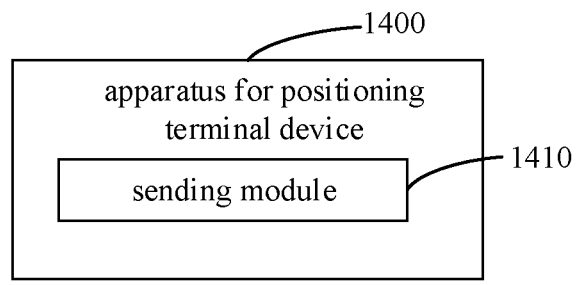
FIG. 14 is a block diagram of an apparatus for positioning a terminal device according to an embodiment of the disclosure.

As illustrated in FIG. 14, the apparatus 1400 for positioning a terminal device includes: a sending module 1410.

The sending module 1410 is configured to send a target public key digest matching a positioning period to a relay device in response to reaching the positioning period, in which the target public key digest is configured to, at the relay device, send the target public key digest to a server, verify a target public key in response to receiving the target public key from the server, encrypt a coordinate location positioned by the relay device using the target public key to obtain a target coordinate location in response to the target public key passing verification based on the target public key digest, and send synchronously the target public key digest and the target coordinate location to the server.

The apparatus for positioning a terminal device according to embodiments of the disclosure is applicable to the third terminal device. The target public key digest matching a positioning period is sent to a relay device in response to reaching the positioning period. The target public key digest is configured to, at the relay device, send the target public key digest to a server, verify a target public key in response to receiving the target public key from the server, encrypt a coordinate location positioned by the relay device by using the target public key to obtain a target coordinate location in response to the target public key passing verification based on the target public key digest, and send synchronously the target public key digest and the target coordinate location to the server. In this way, the third terminal device forwards the target public key digest to the server through the relay device, and the relay device may also verify the target public key sent by the server, and use the target public key to encrypt the location positioned, so as to improve the security of the location of the third terminal device and the rate of being found by the user, and further improve the user experience. At the same time, only the third terminal device is required to have certain storage and wireless broadcasting capabilities, which reduces the requirements of the third terminal device.

In order to implement the above embodiments in FIG. 9, the disclosure further provides another apparatus for positioning a terminal device. The apparatus for positioning a terminal device may be applicable to a server.

Figure 15:
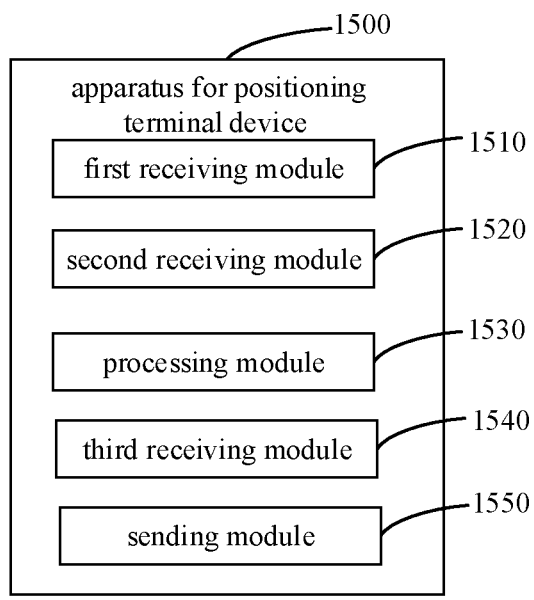
FIG. 15 is a block diagram of an apparatus for positioning a terminal device according to an embodiment of the disclosure.

As illustrated in FIG. 15, the apparatus 1500 for positioning a terminal device includes: a first receiving module 1510, a second receiving module 1520, a processing module 1530, a third receiving module 1540 and a sending module 1550.

The first receiving module 1510 is configured to receive a query instruction from a first terminal device, in which the query instruction is configured to query a target coordinate location of a terminal device to be found; the second receiving module 1520 is configured to receive a target public key digest from the terminal device to be found; the processing module 1530 is configured to determine a target public key matching the target public key digest and send the target public key to the terminal device to be found; the third receiving module 1540 is configured to receive a target coordinate location and the target public key digest from the terminal device to be found, wherein the target coordinate location is obtained by encrypting a coordinate location positioned by the terminal device to be found using the target public key in response to the target public key passes verification based on the target public key digest; and the sending module 1550 is configured to send the target coordinate location and the target public key digest to the first terminal device.

As a possible implementation manner of embodiments of the disclosure, the apparatus 1500 further includes: a fourth receiving module.

The fourth receiving module is configured to receive at least one public-private key pair from the first terminal device and a public key digest matching each public key of the at least one public-private key pair, in which each public key is configured to determine a target public key matching the target public key digest based on the public key digest matching each public key when the server receives the target public key digest from the device to be found, and send the target public key to the terminal device to be found.

The apparatus for positioning a terminal device according to embodiments of the disclosure is applicable to the server. The query instruction from the first terminal device is received, in which the query instruction is configured to query the target coordinate location of a terminal device to be found; the target public key digest from the terminal device to be found is received; the target public key matching the target public key digest is determined and sent to the terminal device to be found; and the target coordinate location and the target public key digest are sent to the first terminal device. Therefore, only the first terminal device may decrypt the target coordinate location using the target private key, the server may not decrypt the target coordinate location of the terminal device to be found, and other terminal devices may not illegally obtain the location of the terminal device to be found from the server, so that the location of the terminal device to be found will not be leaked, and the security of the location of the terminal device to be found and the rate of being found by the user are improved, which improves the user experience.

In order to realize the above embodiments, the disclosure also proposes an electronic device. The electronic device includes: at least one processor; and a memory communicatively coupled to the at least one processor; in which the memory is configured to store instructions executable by the at least one processor, and when the instructions are executed by the at least one processor, the at least one processor is caused to perform the method as described in any embodiment of FIG. 1 to FIG. 3, or the method as described in any embodiment of FIG. 4 to FIG. 6, or the method as described in any embodiment of FIG. 7, or the method as described in any embodiment of FIG. 8, or the method as described in any embodiment of FIG. 9.

In order to realize the above embodiments, the disclosure also proposes a non-transitory computer-readable storage medium. The non-transitory computer-readable storage medium has stored therein a computer program. When the computer program is executed by a processor, the method as described in any embodiment of FIG. 1 to FIG. 3, or the method as described in any embodiment of FIG. 4 to FIG. 6, or the method as described in any embodiment of FIG. 7, or the method as described in any embodiment of FIG. 8, or the method as described in any embodiment of FIG. 9 is performed.

In order to realize the above embodiments, the disclosure also proposes a computer program product. When instructions in the computer program product are executed by a processor, the method as described in any embodiment of FIG. 1 to FIG. 3, or the method as described in any embodiment of FIG. 4 to FIG. 6, or the method as described in any embodiment of FIG. 7, or the method as described in any embodiment of FIG. 8, or the method as described in any embodiment of FIG. 9 is performed.

Figure 16:
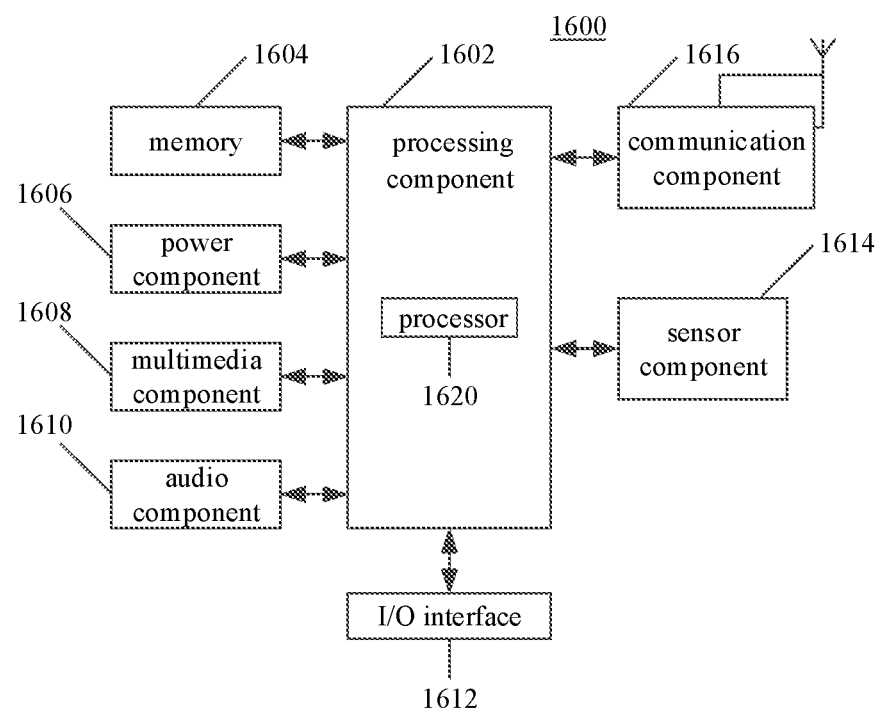
FIG. 16 is a block diagram of a terminal according to an embodiment of the disclosure.

FIG. 16 is a block diagram of a terminal device according to an embodiment. For example, the terminal device 1600 may be a mobile phone, a computer, a digital broadcast terminal, a messaging device, a gaming console, a tablet, a medical device, exercise equipment, a personal digital assistant, and the like.

Referring to FIG. 16, the terminal device 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 typically controls overall operations of the terminal device 1600, such as the operations associated with display, telephone calls, data communications, camera operations, and recording operations. The processing component 1602 may include one or more processors 1620 to execute instructions to perform all or part of the steps in the above described methods. Moreover, the processing component 1602 may include one or more modules which facilitate the interaction between the processing component 1602 and other components. For instance, the processing component 1602 may include a multimedia module to facilitate the interaction between the multimedia component 1608 and the processing component 1602.

The memory 1604 is configured to store various types of data to support the operation of the terminal device 1600. Examples of such data include instructions for any applications or methods operated on the terminal device 1600, contact data, phonebook data, messages, pictures, video, etc. The memory 1604 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1606 provides power to various components of the terminal device 1600. The power component 1606 may include a power management system, one or more power sources, and any other components associated with the generation, management, and distribution of power in the terminal device 1600.

The multimedia component 1608 includes a screen providing an output interface between the terminal device 1600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and the rear camera may receive an external multimedia datum while the terminal device 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone ("MIC") configured to receive an external audio signal when the terminal device 1600 is in an operation mode, such as a call mode, a recording mode, and a voice recognition mode. The received audio signal may be further stored in the memory 1604 or transmitted via the communication component 1616. In some embodiments, the audio component 1610 further includes a speaker to output audio signals.

The I/O interface 1612 provides an interface between the processing component 1602 and peripheral interface modules, such as a keyboard, a click wheel, buttons, and the like. The buttons may include, but are not limited to, a home button, a volume button, a starting button, and a locking button.

The sensor component 1614 includes one or more sensors to provide status assessments of various aspects of the terminal device 1600. For instance, the sensor component 1614 may detect an open/closed status of the terminal device 1600, relative positioning of components, e.g., the display and the keypad, of the terminal device 1600, a change in position of the terminal device 1600 or a component of the terminal device 1600, a presence or absence of user contact with the terminal device 1600, an orientation or an acceleration/deceleration of the terminal device 1600, and a change in temperature of the terminal device 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an accelerometer sensor, a gyroscope sensor, a magnetic sensor, a pressure sensor, or a temperature sensor.

The communication component 1616 is configured to facilitate communication, wired or wirelessly, between the terminal device 1600 and other devices. The terminal device 1600 can access a wireless network based on a communication standard, such as WiFi, 4G, or 5G, or a combination thereof. In one exemplary embodiment, the communication component 1616 receives a broadcast signal or broadcast associated information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is also provided a non-transitory computer-readable storage medium including instructions, such as included in the memory 1604, executable by the processor 1620 in the terminal device 1600, for performing the above-described methods. For example, the non-transitory computer-readable storage medium may be a ROM, a RAM, a CD-ROM, a magnetic tape, a floppy disc, an optical data storage device, and the like.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the disclosure. Furthermore, the particular features, structures, materials, or characteristics may be combined in any suitable manner in one or more embodiments or examples.

It is to be understood that, in the description of the disclosure, terms of "first" and "second" are only used for description and cannot be seen as indicating or implying relative importance. Unless otherwise stipulated and restricted, it is to be explained that terms of "linkage" and "connection" shall be understood broadly, for example, it could be mechanical connection or electrical connection; it could be direct linkage, indirect linkage via intermediate medium. Those skilled in the art shall understand the concrete notations of the terms mentioned above according to specific circumstances. Furthermore, unless otherwise explained, it is to be understood that a term of "a plurality of" refers to two or more.

Any process or method described in a flow chart or described herein in other ways may be understood to include one or more modules, segments or portions of codes of executable instructions for achieving specific logical functions or steps in the process, and the scope of a preferred embodiment of the disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the disclosure may be achieved by commanding the related hardware with programs. The programs may be stored in a computer readable storage medium, and the programs comprise one or a combination of the steps in the method embodiments of the disclosure when run on a computer.

In addition, each function cell of the embodiments of the disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the disclosure, and changes, alternatives, and modifications can be made in the embodiments without departing from spirit, principles and scope of the disclosure.

What is claimed is:

1. A method for positioning a terminal device, for a first terminal device, comprising:
   sending a query instruction to a server, wherein the query instruction is configured to query a target coordinate location of the terminal device to be found;
   receiving a query response from the server, wherein:
      the query response comprises the target coordinate location and a target public key digest,
      the target coordinate location comprises a coordinate location encrypted using a target public key in response to the target public key passing verification based on the target public key digest, and
      the coordinate location is obtained by locating the terminal device to be found;
   determining a target private key based on the target public key digest; and
   decrypting the target coordinate location using the target private key to obtain the coordinate location located by the terminal device to be found.

2. The method of claim 1, further comprising:
   generating a public-private key pair, wherein a public key and a private key in the public-private key pair have a one-to-one correspondence;
   locally storing the public-private key pair;
   and for the public-private key pair stored locally:
   sending the public key and a public key digest matching the public key to the server; wherein the public key is configured to (i) when the server receives the target public key digest from the terminal device to be found, determine the target public key matching the target public key digest based on the public key digest, and (ii) send the target public key to the terminal device to be found.

3. The method of claim 2, wherein, for the public-private key pair stored locally, sending the public key and the public key digest matching the public key, comprises:
   for the public-private key pair stored locally, determining the public key digest matching the public key; and
   sending the public key and the public key digest matching the public key to the server in response to a launching instruction.

4. A method for positioning a terminal device, for a second terminal device, comprising:
   sending a target public key digest matching a positioning period to a server in response to reaching the positioning period;
   receiving a target public key from the server and verifying the target public key based on the target public key digest;
   encrypting a coordinate location positioned by the second terminal device using the target public key to obtain a target coordinate location in response to the target public key passing verification based on the target public key digest; and
   sending synchronously the target public key digest and the target coordinate location to the server.

5. The method of claim 4, further comprising:
   receiving at least one public key digest from a first terminal device;
   correspondingly, sending the target public key digest matching the positioning period to the server in response to reaching the positioning period, comprises:
   determining the target public key digest matching the positioning period from the at least one public key digest in response to reaching the positioning period; and
   forwarding the target public key digest to the server through a relay device.

6. The method of claim 5, wherein, sending the target public key digest comprises:
   determining a number of periods between the positioning period and an initial positioning period; and
   determining the target public key digest matching the positioning period based on the number of periods,
   wherein there is a corresponding relationship between various positioning periods and the at least one public key digest.

7. The method of claim 5, wherein, forwarding comprises:
   sending the target public key digest to the relay device by wireless connection; and
   forwarding the target public key digest to the server through the relay device.

8. The method of claim 4, wherein sending the target public key digest comprises:
   sending the target public key digest matching the positioning period to a relay device, and
   sending the target public key digest matching the positioning period to the server through the relay device.

9. An electronic device, comprising:
   a processor;
   a memory, connected communicatively to the processor, and storing machine readable instructions that, when executed by the processor, cause the processor to:
   send a query instruction to a server, wherein the query instruction is configured to query a target coordinate location of a terminal device to be found;
   receive a query response from the server, wherein:
      the query response comprises the target coordinate location and a target public key digest,
      the target coordinate location comprises a coordinate location encrypted using a target public key in response to the target public key passing verification based on the target public key digest, and
      the coordinate location is obtained by locating the terminal device to be found;
   determine a target private key based on the target public key digest; and
   decrypt the target coordinate location using the target private key to obtain the coordinate location located by the terminal device to be found.

10. The electronic device of claim 9, the memory further storing instructions that, when executed by the processor, cause the processor to:
    generate a public-private key pair, wherein a public key and a private key in the public-private key pair have a one-to-one correspondence;
    locally store the public-private key pair; and
    for the public-private key pair stored locally, send the public key and a public key digest matching the public key to the server; wherein the public key is configured to (i) when the server receives the target public key digest from the terminal device to be found, determine the target public key matching the target public key digest based on the public key digest, and (ii) send the target public key to the terminal device to be found.

11. The electronic device of claim 10, the memory further storing instructions that, when executed by the processor, cause the processor to:

for the public-private key pair stored locally, determine the public key digest matching the public key; and send the public key and the public key digest matching the public key to the server in response to a launching instruction.

12. An electronic device, comprising:

a processor; and a memory, connected communicatively to the processor, and storing machine readable instructions that, when executed by the processor, cause the processor to execute the method of claim 4.

13. An electronic device, comprising:

a processor; and a memory, connected communicatively to the processor, and storing machine readable instructions that, when executed by the processor, cause the processor to execute the method of claim 8.

14. A non-transitory computer-readable storage medium having stored therein a computer program that, when executed by a processor, causes the processor to execute the method of claim 1.

15. A non-transitory computer-readable storage medium having stored therein a computer program that, when executed by a processor, causes the processor to execute the method of claim 4.

16. A non-transitory computer-readable storage medium having stored therein a computer program that, when executed by a processor, causes the processor to execute the method of claim 8.

* * * * *